US012794681B2

(12) United States Patent
Kahn et al.

(10) Patent No.: US 12,794,681 B2
(45) Date of Patent: Nov. 10, 2026

(54) POST-QUANTUM MULTITENANT KEY DERIVATION

(71) Applicant: INTUIT INC., Mountain View, CA (US)

(72) Inventors: Laetitia Kahn, Tel Aviv (IL); Margarita Vald, Hod Hasharon (IL); Julia Zarubinsky, Hod Hasharon (IL); Yaron Sheffer, Hod-Hasharon (IL)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 19/055,797

(22) Filed: Feb. 18, 2025

(65) Prior Publication Data

US 2026/0246617 A1 Aug. 20, 2026

(51) Int. Cl.
*H04L 9/08* (2006.01)

(52) U.S. Cl.
CPC ............ *H04L 9/0825* (2013.01); *H04L 9/085* (2013.01); *H04L 2209/04* (2013.01)

(58) Field of Classification Search
CPC .............................. H04L 9/0825; H04L 9/085
See application file for complete search history.

(56) References Cited

U.S. PATENT DOCUMENTS 8,954,605 B1 * 2/2015 Hecht ..................... H04L 51/18 709/219
11,870,886 B2 1/2024 Vald et al.
2006/0129812 A1 * 6/2006 Mody ..................... H04L 9/321 713/168
2008/0037785 A1 * 2/2008 Gantman .............. H04L 9/0872 380/278
2018/0115535 A1 * 4/2018 Mehta ..................... G06F 21/10
2020/0174990 A1 * 6/2020 Pratkanis .............. H04L 9/0637
2022/0052840 A1 2/2022 Vald et al.
2022/0173900 A1 * 6/2022 Becher ...................... H04L 9/50
2023/0412376 A1 * 12/2023 Garcia Morchon ......................... H04L 63/0464

* cited by examiner

*Primary Examiner* — Vance M Little
(74) *Attorney, Agent, or Firm* — Patterson + Sheridan, LLP

(57) ABSTRACT

Aspects of the present disclosure relate to techniques for deriving cryptographic keys. Embodiments include using a key encapsulation mechanism to encrypt various data items transferred between a first remote server and a client device during a key derivation process. In some embodiments, the encrypted data items include a blinding value and a client key. Embodiments further include using a hybrid post-quantum key exchange technique to securely store and transfer keys used by the remote servers as part of the key derivation process.

20 Claims, 6 Drawing Sheets

POST-QUANTUM MULTITENANT KEY DERIVATION

INTRODUCTION

Aspects of the present disclosure relate to techniques for deriving cryptographic keys for encrypting and decrypting data. In particular, techniques described herein involve using encapsulation and other security techniques to secure a key derivation protocol against attacks from advanced quantum computers.

BACKGROUND

Every year, millions of people, businesses, and organizations around the world use computing technologies to transfer data. To prevent malicious parties such as hackers from accessing the data, encryption may be used to create a secure representation of the data. After data is encrypted, only a party with access to the encryption key may be able to decrypt, and thus view, the data. Thus, encryption allows for preventing unauthorized parties from viewing the data.

Encryption may be used to secure multitenant environments (e.g., any type of computing environment where information is transferred from one client to another). For encrypted data to be viewed by multiple clients, each client may need to derive the encryption key used to encrypt/decrypt the data. As an example, a message from a first client to a second client may be encrypted at the first client and then transferred to the second client. To access the message, the second client may derive the key using a key derivation protocol and then decrypt the message using the derived key.

However, key derivation protocols may be subject to breaches (e.g., a quantum computer may be used to breach a key derivation system and access the key). In the event of a breach, a malicious party may be able to access the encryption key, and thus access the encrypted data. Techniques such as the hybrid post-quantum key exchange option for the transport layer security network encryption protocol may be used to secure the channels of the key exchange system (e.g., a channel between a client and the project key server). However, such techniques may require a large amount of resources to implement and may be inefficient to operate when used for many channels in a key derivation system.

Thus, there is a need in the art for improved techniques of deriving cryptographic keys.

BRIEF SUMMARY

Certain embodiments provide a processor-implemented method. The method generally includes: sending, to a first remote server via a client device: a public encapsulation key; and a request for a blinding value and a client key; encapsulating the public encapsulation key via the first remote server to generate an encapsulation ciphertext and a shared secret; encrypting the blinding value and the client key based on the shared secret; transmitting the encapsulation ciphertext, the encrypted blinding value, and the encrypted client key to the client device; decapsulating a private encapsulation key based on the encapsulation ciphertext to obtain the shared secret at the client device; decrypting the encrypted blinding value and the encrypted client key at the client device using the shared secret; generating, via the client device, a derivation input using the client key and by hashing derivation data; transmitting, via the client device, the derivation input to a second remote server; receiving, via the client device from the second remote server, a blinded derived key generated by the second remote server using a blinded root key and the derivation input; unblinding, via the client device using the blinding value, the blinded derived key to generate a derived key; and using the derived key to encrypt or decrypt data.

Some embodiments provide a processor-implemented method. The method generally includes: generating, via a client device, a public encapsulation key and a private encapsulation key; sending, to a first remote server via the client device: the public encapsulation key; and a request for a blinding value and a client key; encapsulating the public encapsulation key via the first remote server to generate an encapsulation ciphertext and a shared secret; encrypting the blinding value and the client key based on the shared secret; transmitting the encapsulation ciphertext, the encrypted blinding value, and the encrypted client key to the client device; decapsulating the private encapsulation key based on the encapsulation ciphertext to obtain the shared secret at the client device; decrypting the encrypted blinding value and the encrypted client key at the client device using the shared secret; generating, via the client device, a derivation input using the client key and by hashing derivation data; transmitting, via the client device, the derivation input to a second remote server; receiving, via the client device from the second remote server, a blinded derived key generated by the second remote server using a blinded root key and the derivation input, wherein the blinded derived key is generated based on encrypting, at the first remote server, a product of a project key and the blinding value using a given encryption key that is transmitted from a database to the first remote server using a hybrid post-quantum key exchange technique; unblinding, via the client device using the blinding value, the blinded derived key to generate a derived key; and using the derived key to encrypt or decrypt data.

Certain embodiments provide a method of deriving cryptographic keys. The method generally includes: using a key encapsulation mechanism to establish a shared secret between a client device and a first remote server; encrypting a blinding value and a client key using the shared secret at the first remote server; decrypting the encrypted blinding value and the encrypted client key at the client device using the shared secret; generating a derivation input using the client device based on the client key, wherein the derivation input is transmitted to a second remote server; generating a blinded derived key at a second remote server based on the derivation input; and unblinding the blinded derived key at the client device using the blinding value.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for deriving cryptographic keys.

To generate a cryptographic key for encrypting and decrypting data, the information used to derive the key may be passed between the various client devices in a computing system and one or more remote servers, such as a project key server and a virtual key management server. According to certain embodiments disclosed herein, as part of a key derivation protocol, various links between the client devices and the project key server may be protected using encapsulation techniques to provide enhanced security as opposed to existing techniques that do not use such encapsulation techniques to protect these links. For example, encapsulation techniques may be used to protect one or more encryption keys used within the protocol that is used to derive the main key. The protected values may include, for instance, a blinding value used to blind data used in the key derivation protocol and a client key used to derive the key. In some embodiments, a hybrid post-quantum key exchange option for the transport layer security (TLS) network encryption protocol (e.g., which is an available option in certain TLS libraries, and which involves using both classical and post-quantum cryptography to secure a TLS connection) may be used to secure one or more items used in the key derivation protocol.

Embodiments of the present disclosure provide numerous technical and practical effects and benefits. For example, the protocols disclosed herein may be secure from advanced hacking attacks (e.g., attacks involving quantum computers) due to the use of encapsulation techniques to protect particular links. Embodiments disclosed herein may also provide an optimal balance between security and efficiency. For instance, securing every channel and/or item used in an encryption protocol using the hybrid post-quantum key exchange option may require an excessive amount of resources to implement and operate, whereas techniques disclosed herein may achieve equally effective security from attacks while requiring much fewer resources by protecting particular targeted aspects of the process (e.g., a blinding value used to blind data used in the key derivation protocol and a client key used to derive the key).

Example of Computing Components Related to Deriving Cryptographic Keys

Figure 1:
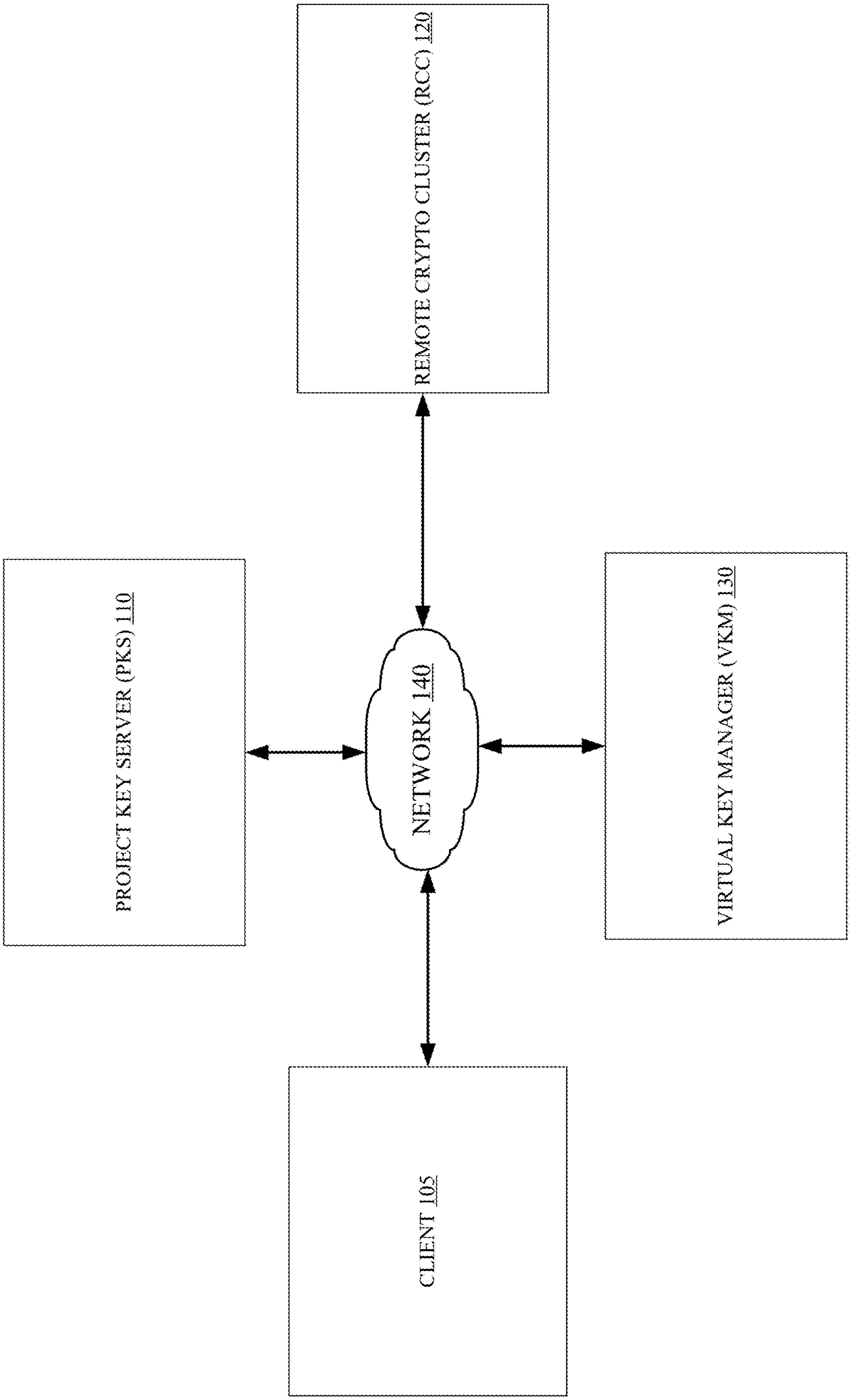
FIG. 1 depicts an example of computing components related to deriving cryptographic keys.

FIG. 1 depicts an example of computing components related to deriving cryptographic keys.

In the illustrated example, the key derivation system includes elements such as a project key server (PKS) 110, remote crypto cluster (RCC) 120, virtual key manager (VKM) 130, and/or at least one client 105. Each of these elements may comprise one or more physical computing devices. In one or more embodiments, the RCC 120 may be merged into the VKM 130. In some embodiments, the client 105 may be any device configured to provide access to remote applications. For example, the client 105 may be a smartphone, personal computer, tablet, laptop computer, or other device. It should be appreciated that the disclosed principles should not be limited to the illustrated example and that they can be applied to one or more server computing devices that are separate from a client computing device.

The depicted computing components may communicate with one another through at least one network 140. Network 140 may be the Internet and/or other public or private networks or combinations thereof, or any connection(s) over which data may be transmitted. For example, in some embodiments, the RCC 120, VKM 130, and PKS 110 may communicate with one another over secure channels (e.g., one or more TLS and/or secure sockets layer (SSL) channels). In some embodiments, communication between at least some of the elements of the key derivation system may be facilitated by one or more application programming interfaces (APIs).

The PKS 110, RCC 120, VKM 130, and client 105 are each depicted as single devices for ease of illustration, but those of ordinary skill in the art will appreciate that the PKS 110, RCC 120, VKM 130, and/or client 105 may be embodied in different forms for different implementations. For example, the RCC 120 may be merged into the VKM 130 and the computing components may reside on one or more computing devices. In other embodiments, the PKS 110, RCC 120, and/or VKM 130 may include a plurality of devices. In another example, a plurality of clients 105 may be connected to the network 140 and may use the key derivation services described herein. For instance, a first client may derive a key according to protocols disclosed herein and use the key to encrypt a data item. The encrypted data item may be transmitted to a second client over the network 140. Then, the second client may derive the key to decrypt and access the data item.

Sequence Diagram for Deriving Cryptographic Keys

Figure 2:
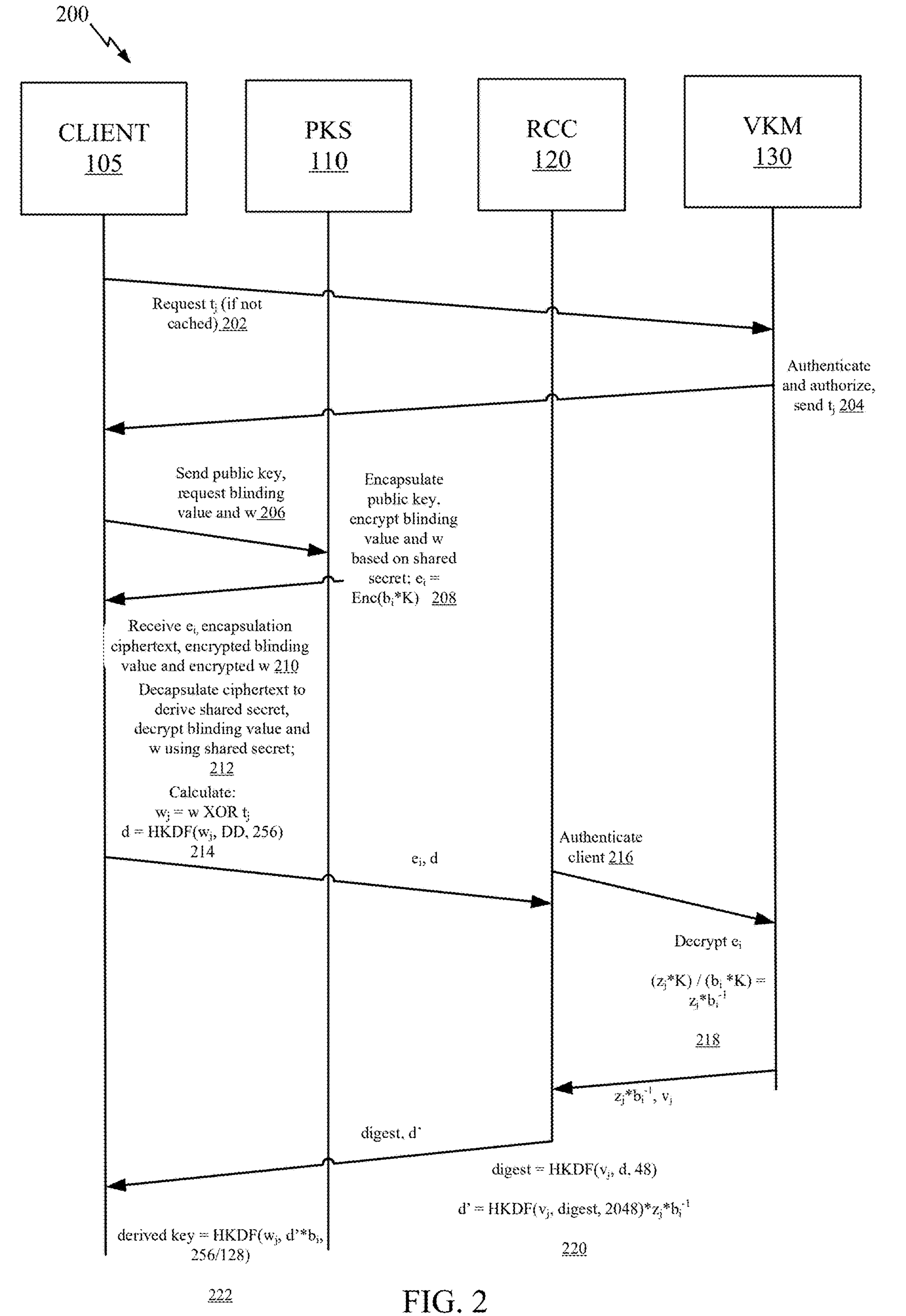
FIG. 2 depicts a sequence diagram for deriving cryptographic keys.

FIG. 2 illustrates a sequence diagram 200 for deriving cryptographic keys according to some embodiments of the present disclosure. Sequence diagram 200 includes client 105, project key server (PKS) 110, remote crypto cluster (RCC) 120, and virtual key manager (VKM) 130, of FIG. 1.

The key derivation protocols discussed herein are described as using specific equations. However, it will be clear to those of ordinary skill in the art that some portions of the protocols may be performed with modifications to the example equations and/or with different processing altogether. The following definitions may be useful for understanding the example equations presented herein:

n is the number of clients.

For $i \in [n]$, $C_i$ is the i'th client and $b_i$ is the blinding value associated with client $C_i$. A blinding value $b_i$ is added to and/or processed with other data to form blinded data, which can only be unblinded using the blinding value $b_i$.

$\mathfrak{l}$ is the number of root keys in the project.

For $j \in [\ell]$, $z_j$, $v_j$, and $t_j$ are respectively the j'th RCC root key and additional variables used for derivation with $z_j$. The length of $z_j$, $v_j$, and $t_j$ is 2,048 bits.

DD is the derivation data supplied by the client.

(vsk, vpk) is the VKM's key pair for RSA encryption. These keys are generated once and vpk is known to all entities in the system.

(sk, vk) is the PKS' key pair for an RSA signature scheme. These keys are generated once and vk is known to all entities in the system.

p is a 2,048 bit prime number generated once and is known to all entities in the system.

K is the project key (i.e., master key) that is generated in $Z_p$.

w is a project-wide client key that is shared among all clients and has a length of 2,048 bits.

pks-project-key-version is the latest project key version generated by the PKS.

vkm-project-key-version is the latest project key version received by VKM.

key-update-value is the ratio of the current project-key and previous project key.

All the definitions are presented as being within the scope of a "project," which may be a partitioning of the key derivation system into multiple key namespaces and multiple clients associated with the namespaces, where (through cryptographic systems and/or methods) a client 105 may be prevented from using keys of a project unless the client 105 is associated with that project. The key derivation system may be configured so that there may be multiple simultaneous projects, e.g., on the same RCC 120 and/or VKM 130, while preserving the guarantee that the client 105 may have access only to keys of projects with which the client 105 is associated. In accordance with the disclosed principles, keys may be used to access projects, which may be any protected service or process.

In one or more embodiments, part of a setup phase is performed by the VKM 130 in response to receiving a VKM setup message "message (VKM setup)" from a client 105. In one or more embodiments, the user of the client is a system operator or other personnel responsible for setting up a project and or its key name space. During the setup phase, the VKM 130 may set vkm-project-key-version (i.e., the latest project key version received by VKM) to 1 and key-update-value (i.e., the ratio of the current project-key and previous project key) to 1. The VKM 130 may store the values of these parameters for later use in a protected keys record.

A second part of the setup phase is performed by the PKS 110 in response to receiving a PKS setup message "message (PKS setup)" from the client. During the setup phase, the PKS 110 will uniformly sample at random $w \leftarrow \{0, 1\}^{2048}$ and $K \leftarrow Z_p$. The PKS 110 may set pks-project-key-version (i.e., the latest project key version generated by the PKS) to 1. The PKS 110 may store the values of these parameters for later use.

The derivation phase may consist of a key generation process and a key derivation protocol. The key generation process may be performed by the VKM 130 in response to receiving a message "message (VKM KeyGen, key-name)" from client $C_i$ asking the VKM to generate a key-name. During the key generation process, the VKM 130 may uniformly sample values at random for the following parameters: $z'_j \leftarrow Z_p$, $v_j \leftarrow \{0, 1\}^{2048}$ and $t_j \leftarrow \{0, 1\}^{2048}$. In one or more embodiments, the VKM 130 may set root key $z'_j = z_j{*}K$, and store the values of $z_j{*}K$, $v_j$, $t_j$, and key-name. This is a protected key generation process performed locally at the VKM 130, which uniquely defines the value of the specific key (since the project key has been defined at this stage).

The key derivation protocol can be performed locally on the client side or remotely involving the VKM 130 (and/or RCC 120). In one or more embodiments, the key derivation protocol may utilize keyed hash function ("HKDF") computations performed by the VKM 130 and the client 105. In one or more embodiments, the keyed hash function HKDF is computed on (key, value, output bit length) as described in more detail below. In accordance with the disclosed principles, the HKDF computations performed by the VKM 130 may be used to prevent a dictionary attack on the derivation-data.

In the example multitenant key derivation protocol shown in FIG. 2, the client computing device 105 may provide blinded and/or hashed derivation data, the VKM 130 may provide a blinded root key, and the RCC 120 may compute a derived key based on the root key and the derivation data. In one or more embodiments, the derived key may be blinded when on the RCC 120, meaning that the RCC 120 will not have access to the cleartext derived key, and can only be unblinded (revealed) by the client 105. This arrangement may yield a low-cost, multitenant key derivation system with strong protection of stored and/or managed data. The key derivation protocol is presented as deriving a single key for a single project or use, but it should be appreciated that the protocol may be performed repeatedly to generate multiple keys in some embodiments.

After the setup phase and the key generation process, the VKM 130, PKS 110 and client 105 may have the following information, states and or conditions. The VKM 130 may have a stored protected keys record comprising the $z_j{*}K$, $v_j$, $t_j$, and key-name parameters ("protected keys record ($z_j{*}K$, $v_j$, $t_j$, and key-name)" and the parameters key-update-value and vkm-project-key-version. The PKS 110 may comprise the project key K, client-key w, and the pks-project-key-version parameter. The client 105 may comprise the derivation data DD and a message m to be encrypted. The client's 105 cache storage may include the client-key w, key identifier $t_j$, client blinding value $b_i$, ciphertext $e_i$, and a signature $\sigma_i$ on the ciphertext $e_i$. In one or more embodiments, the ciphertext $e_i$ is based on an encryption of the tuple $b_i{*}K$ and pks-project-key-version (i.e., $e_i = ENC_{vpk}(b_i{*}K|\text{pks-project-key-version})$. In one or more embodiments, RSA encryption and signatures are used throughout the key derivation protocol. In one or more embodiments, the RSA encryption and signatures use a bit length of 2048.

As described in further detail below, certain embodiments provide that encapsulation may be used to protect certain items exchanged between PKS 110 and the client 105 (e.g., client-key w and client blinding value $b_i$). Additionally, according to some embodiments, the hybrid post-quantum key exchange option for the transport layer security network encryption protocol may be used to secure various items used in the derivation protocol (e.g., keys used by the PKS 110).

At step 202, the client 105 determines if the key identifier $t_j$ is stored within its cache. If the key identifier $t_j$ is not cached, the client 105 may request the VKM 130 to send $t_j$ via a message "message (params-VKM, key-name)" sent to the VKM 130. If the client 105 determines that its cache includes the appropriate parameters, it will not send the message (params-VKM, key-name) to the VKM 130 or the message (params-PKS) to the PKS 110 and the protocol will continue at step 206.

At step 204, the VKM 130 receives and may authenticate the message (params-VKM, key-name). Once authenticated, the VKM 130 may send the key identifier $t_j$ to the client 105 (client $C_i$) in a message "message (RCC-Key-identifier, ti)".

At step 206, the client 105 may generate a public key and private key for encapsulation involving one or more items to be exchanged between the client 105 and PKS 110. The public encapsulation key may be sent to PKS 110 along with a request for the blinding value $b_i$ and/or client-key w.

At step 208, PKS 110 may encapsulate the public encapsulation key (e.g., using a key encapsulation mechanism such as Kyber). The encapsulation may yield an encapsulation ciphertext and a shared secret that are based on the public encapsulation key. The blinding value $b_i$, the project key K, and/or client-key w may each be encrypted using the shared secret as an encryption key. Then, the encapsulation ciphertext may be sent to the client 105 along with the encrypted blinding value $b_i$, client-key w, and ciphertext $e_i$, which is calculated as the encryption of the tuple $b_i$*K and pks-project-key-version (i.e., $e_i=ENC_{vpk}(b_i*K|\text{pks-project-key-version})$). Additionally, in certain embodiments, PKS 110 may derive a signature $\sigma_i$ based on $e_i$ (e.g., $\sigma_i=\text{sign}_{sk}(e_i)$).

In some embodiments, one or more items used by PKS 110 (e.g., the client-key w and encryption keys used to encrypt one or more items, such as the encryption keys used to generate $e_i$ and $\sigma_i$) may be stored in a database, such as a database associated with the Amazon© Web Services Key Management Service (KMS). The KMS hybrid post-quantum key exchange option for the transport layer security network encryption protocol may be used to store the keys and send the keys to PKS 110. Thus, the keys may be secure from attacks that use quantum computers.

At step 210, the encapsulation ciphertext is received by the client 105 along with the encrypted blinding value $b_i$ and/or client-key w.

At step 212, the client 105 decapsulates the encapsulation ciphertext to derive the shared secret (e.g., according to a key encapsulation mechanism such as Kyber). Once the client 105 obtains the shared secret, the client 105 may use the shared secret to decrypt the one or more encrypted items received from PKS 110, such as the blinding value $b_i$ and/or client-key w.

At step 214, the client 105 may have the parameters $t_j$, $b_i$, $e_i$, $\sigma_i$, and/or w, as discussed above, and may record the values of these parameters in its cache memory. As part of the protocol, the client 105 may compute a derivation input "d" using a keyed hash function of the client-key w, key identifier $t_j$, and derivation data DD (e.g., d=HKDF(w XOR $t_j$, DD, 256). The client 105 may send a message "message (Remote-derive-VKM, d, $e_i$, $\sigma_i$, key-name)" to the VKM 130 requesting that the VKM 130 derive values for parameters required for subsequent steps in the key derivation process. In doing so, message (Remote-derive-VKM, d, $e_i$, $\sigma_i$, key-name) may send parameters d, $e_i$, $\sigma_i$, key-name to the VKM 130.

In the illustrated embodiment, the client 105 sending the message (Remote-derive-VKM, d, $e_i$, $\sigma_i$, key-name) is initially authenticated at the RCC 120 (at step 216) before the message is processed by the VKM 130. As noted above, the RCC 120 may be implemented as part of the VKM 130, meaning that this authentication step may be performed by the VKM 130. At step 216, upon receiving the message (Remote-derive-VKM, d, $e_i$, $\sigma_i$, key-name), the VKM 130 may verify the signature $\sigma_i$ with the PKS's 110 vk key in, for example, an RSA signature verification process. If the signature $\sigma_i$ is not verified, then the key derivation process terminates.

If, however, the signature $\sigma_i$ is verified, at step 218 the VKM 130 may decrypt $e_i$ with the VKM's 130 vsk key in, for example, an RSA decryption process to obtain the tuple $b_i$*K|pks-project-key-version. The VKM 130 may calculate the inverse of the $b_i$*K (e.g., $(b_i*K)^{-1}$) and if VKM 130 determines that the pks-project-key-version is equal to the vkm-project-key-version, it may compute $z_jb_i^{-1}=z_jK*(b_i*K)^{-1}$ where $z_j$ is the key associated with key-name. However, if the pks-project-key-version is not equal to the vkm-project-key-version, the decrypted $b_i$*K is multiplied by the key-update-value before computing $z_jb_i^{-1}=z_jK*(b_i*K)^{-1}$.

At step 220, the RCC 120 or VKM 130 may compute the digest parameter as the keyed hash function of $v_j$ and d (e.g., digest=HKDF($v_j$, d, 48)). The RCC 120 or VKM 130 may also compute a modified d parameter (i.e., d') as the keyed hash function of $v_j$ and digest (e.g., d=HKDF($v_j$, digest, 2048)*$z_jb_i^{-1}$). In addition, the RCC 120 or VKM 130 may send a message "message (Remote-derive-Client, digest, d')" to the client 105 requesting that the client compute a derived key. The message (Remote-derive-Client, digest, d') may send the parameters digest and d' to the client 105. In the illustrated embodiment, the RCC 120 is shown as performing step 220, but it should be appreciated that this step may be performed by the VKM 130, particularly if the RCC 120 is merged into the VKM 130.

At step 222, after receiving the message (Remote-derive-Client, digest, d'), the client 105 may compute the derived key dd' as the hash function of w XOR $t_j$ and d'*$b_i$ (i.e., dd'=HKDF((w XOR $t_j$, d'*$b_i$, 256/128). In addition, the client 105 may encrypt/decrypt the message m using the derived key dd' and store the digest and ciphertext.

In certain embodiments, because encapsulation is used to secure data items exchanged between PKS 110 and the client 105 (e.g., blinding value $b_i$ and the client key w), the key derivation protocol may be immune to attacks from quantum computers. For example, if a hacker is unable to obtain the blinding value used in the protocol, the hacker may be unable to derive the key and access the content that is encrypted using the key. Additionally, embodiments that use the hybrid post-quantum key exchange option for the transport layer security network encryption protocol provide further encryption against quantum attacks by protecting keys used by PKS 110 to encrypt/generate values used in the key derivation protocol. Furthermore, because these techniques are applied at targeted areas in the protocol, the immunity from quantum attacks may be achieved in a way that is simpler and requires fewer resources to implement/execute than other techniques and protocols.

Sequence Diagram for an Encapsulation Process

Figure 3:
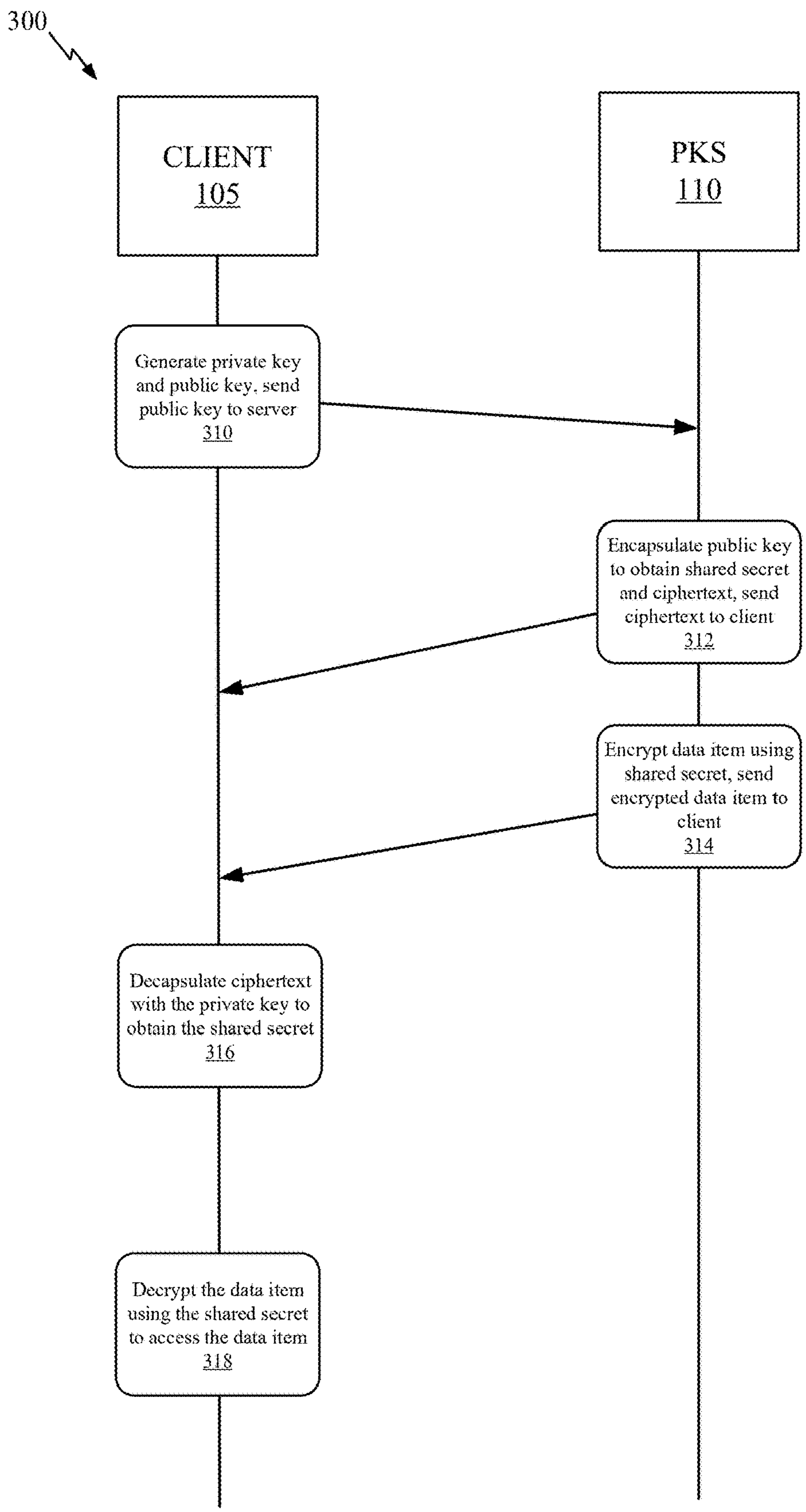
FIG. 3 depicts a sequence diagram for an encapsulation process.

FIG. 3 illustrates a sequence diagram 300 for an encapsulation process according to some embodiments of the present disclosure. The sequence diagram 300 as shown includes client 105 of FIG. 1 and a server such as PKS 110 of FIG. 1. The encapsulation may be performed using a key encapsulation mechanism such as Kyber.

Data items (e.g., messages) may be sent between the client 105 and PKS 110. To prevent other parties from accessing the data items, the data items may be encrypted such that only the client 105 and PKS 110 are able to access the data items. The encapsulation protocol described below may be used for encrypting a data item sent from PKS 110 to the client 105. Based on this encapsulation protocol, the encryption key used by the sender to encrypt the data item may be derived by the recipient and used to decrypt the data item.

At 310, the client 105 generates a private key and a public key, and the public key is sent to PKS 110.

At 312, PKS 110 encapsulates the public key (e.g., using a key encapsulation mechanism) to generate a shared secret and a ciphertext. The shared secret may be used as an encryption key for encrypting/decrypting the data item. The ciphertext, which may be used to derive the shared secret, is sent to the client 105.

At 314, the server encrypts the data item using the shared secret as the encryption key. PKS 110 then sends the encrypted data item to the client 105.

At 316, the client 105 decapsulates (e.g., using a key encapsulation mechanism) the ciphertext based on the private key to obtain the shared secret.

At 318, the client 105 uses the shared secret to decrypt and access the encrypted data item.

Example Operations Related to Deriving Cryptographic Keys

Figure 4:
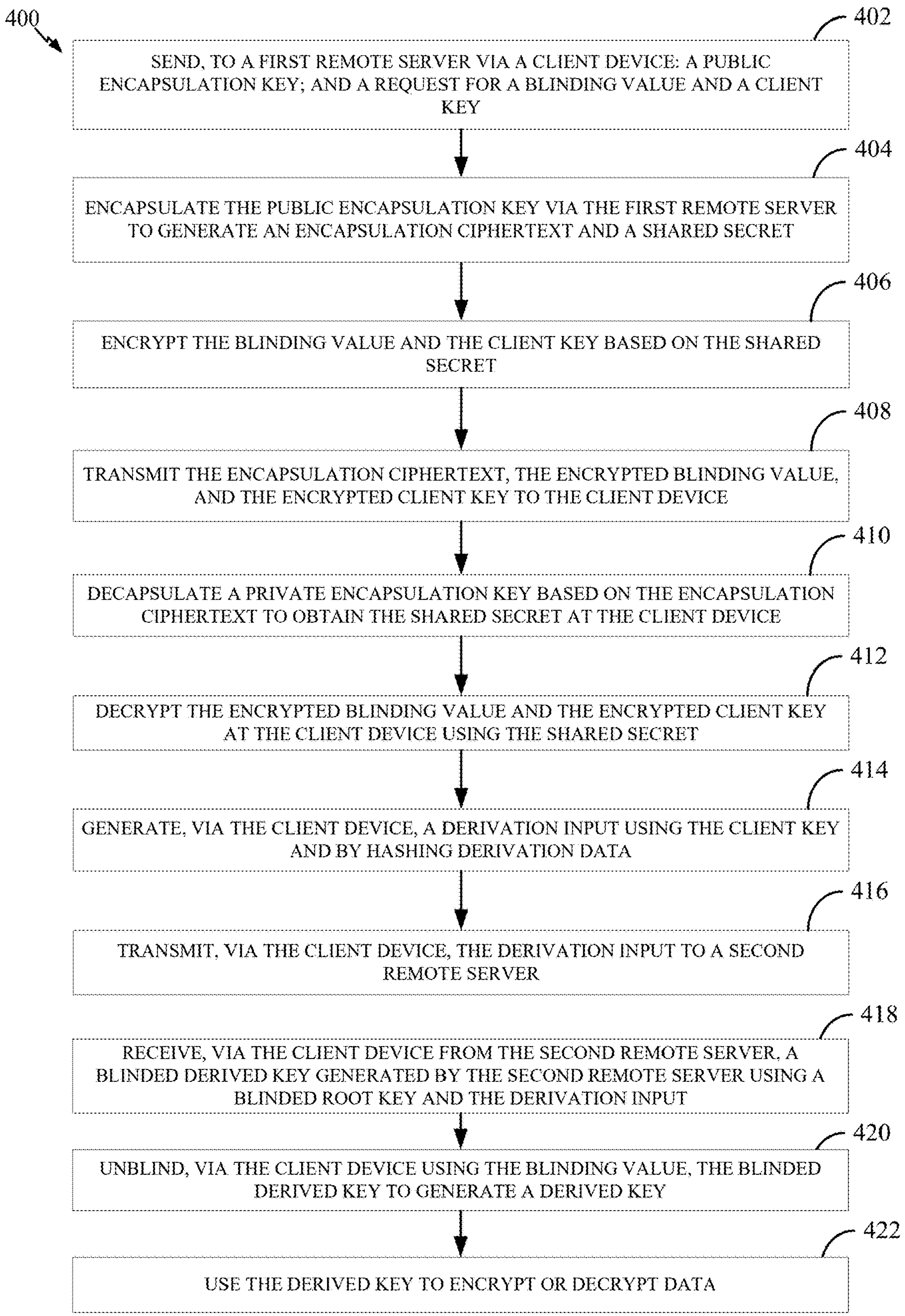
FIG. 4 depicts example operations related to deriving cryptographic keys.

FIG. 4 depicts example operations 400 related to deriving cryptographic keys. For example, operations 400 may be performed by one or more of the components described with respect to FIG. 1, FIG. 2, and FIG. 3.

Operations 400 begin at step 402 with sending, to a first remote server via a client device: a public encapsulation key; and a request for a blinding value and a client key. According to some embodiments, the public encapsulation key and private encapsulation key are generated at the client device.

Operations 400 continue at step 404 with encapsulating the public encapsulation key via the first remote server to generate an encapsulation ciphertext and a shared secret.

Operations 400 continue at step 406 with encrypting the blinding value and the client key based on the shared secret.

Operations 400 continue at step 408 with transmitting the encapsulation ciphertext, the encrypted blinding value, and the encrypted client key to the client device.

Operations 400 continue at step 410 with decapsulating a private encapsulation key based on the encapsulation ciphertext to obtain the shared secret at the client device.

Operations 400 continue at step 412 with decrypting the encrypted blinding value and the encrypted client key at the client device using the shared secret.

Operations 400 continue at step 414 with generating, via the client device, a derivation input using the client key and by hashing derivation data. In certain embodiments, generating the derivation input is based on a client key identifier generated at the second remote server. Some embodiments provide that the client key identifier is requested by the client device from the second remote server based on a determination that the client key identifier is not cached at the client device.

Operations 400 continue at step 416 with transmitting, via the client device, the derivation input to a second remote server.

Operations 400 continue at step 418 with receiving, via the client device from the second remote server, a blinded derived key generated by the second remote server using a blinded root key and the derivation input. According to some embodiments, generating the blinded derived key is based on encrypting, at the first remote server, a product of a project key and the blinding value using a given encryption key that is transmitted from a database to the first remote server using a hybrid post-quantum key exchange technique. Certain embodiments provide that generating the blinded derived key is further based on transmitting the encrypted product from the first remote server to the client device; and transmitting the encrypted product from the client device to the second remote server. Some embodiments provide that generating the blinded derived key is further based on multiplying the hashed derivation data based on the encrypted product. In certain embodiments, the blinded derived key is generated based on verifying a signature received from the client device.

Operations 400 continue at step 420 with unblinding, via the client device using the blinding value, the blinded derived key to generate a derived key.

Operations 400 continue at step 422 with using the derived key to encrypt or decrypt data.

Figure 5:
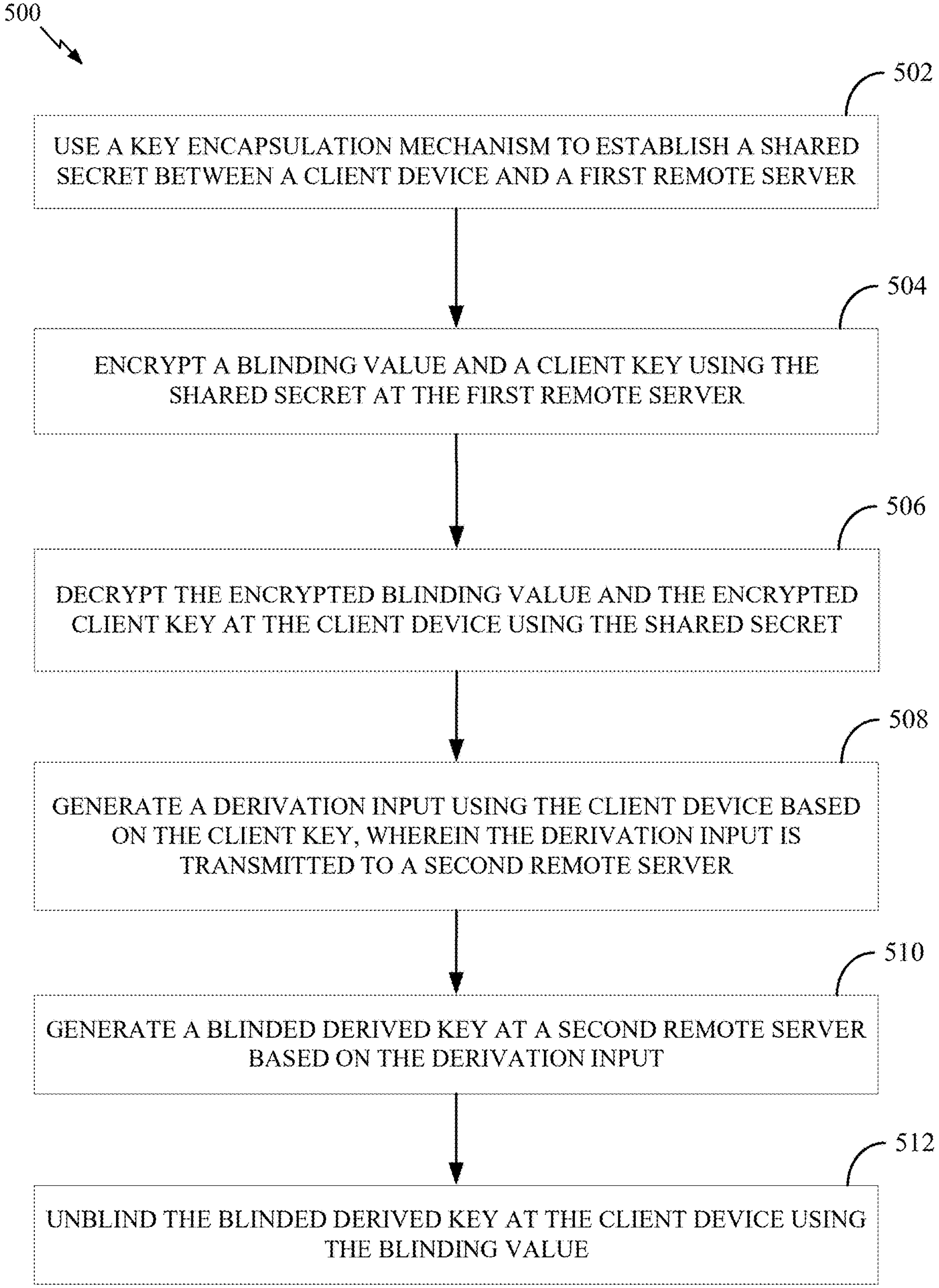
FIG. 5 depicts additional example operations related to deriving cryptographic keys.

FIG. 5 depicts example operations 500 related to deriving cryptographic keys. For example, operations 500 may be performed by one or more of the components described with respect to FIG. 1, FIG. 2, and FIG. 3.

Operations 500 begin at step 502 with using a key encapsulation mechanism to establish a shared secret between a client device and a first remote server.

Operations 500 continue at step 504 with encrypting a blinding value and a client key using the shared secret at the first remote server.

Operations 500 continue at step 506 with decrypting the encrypted blinding value and the encrypted client key at the client device using the shared secret.

Operations 500 continue at step 508 with generating a derivation input using the client device based on the client key, wherein the derivation input is transmitted to a second remote server. In certain embodiments, generating the derivation input is based on a client key identifier generated at the second remote server. Some embodiments provide that the client key identifier is requested by the client device from the second remote server based on a determination that the client key identifier is not cached at the client device.

Operations 500 continue at step 510 with generating a blinded derived key at a second remote server based on the derivation input. According to some embodiments, generating the blinded derived key is based on encrypting, at the first remote server, a product of a project key and the blinding value using a given encryption key that is transmitted from a database to the first remote server using a hybrid post-quantum key exchange technique. Certain embodiments provide that generating the blinded derived key is further based on transmitting the encrypted product from the first remote server to the client device; and transmitting the encrypted product from the client device to the second remote server. Some embodiments provide that generating the blinded derived key is further based on multiplying hashed derivation data based on the encrypted product. In certain embodiments, the blinded derived key is generated based on verifying a signature received from the client device.

Operations 500 continue at step 512 with unblinding the blinded derived key at the client device using the blinding value.

Example of a Processing System for Deriving Cryptographic Keys

Figure 6:
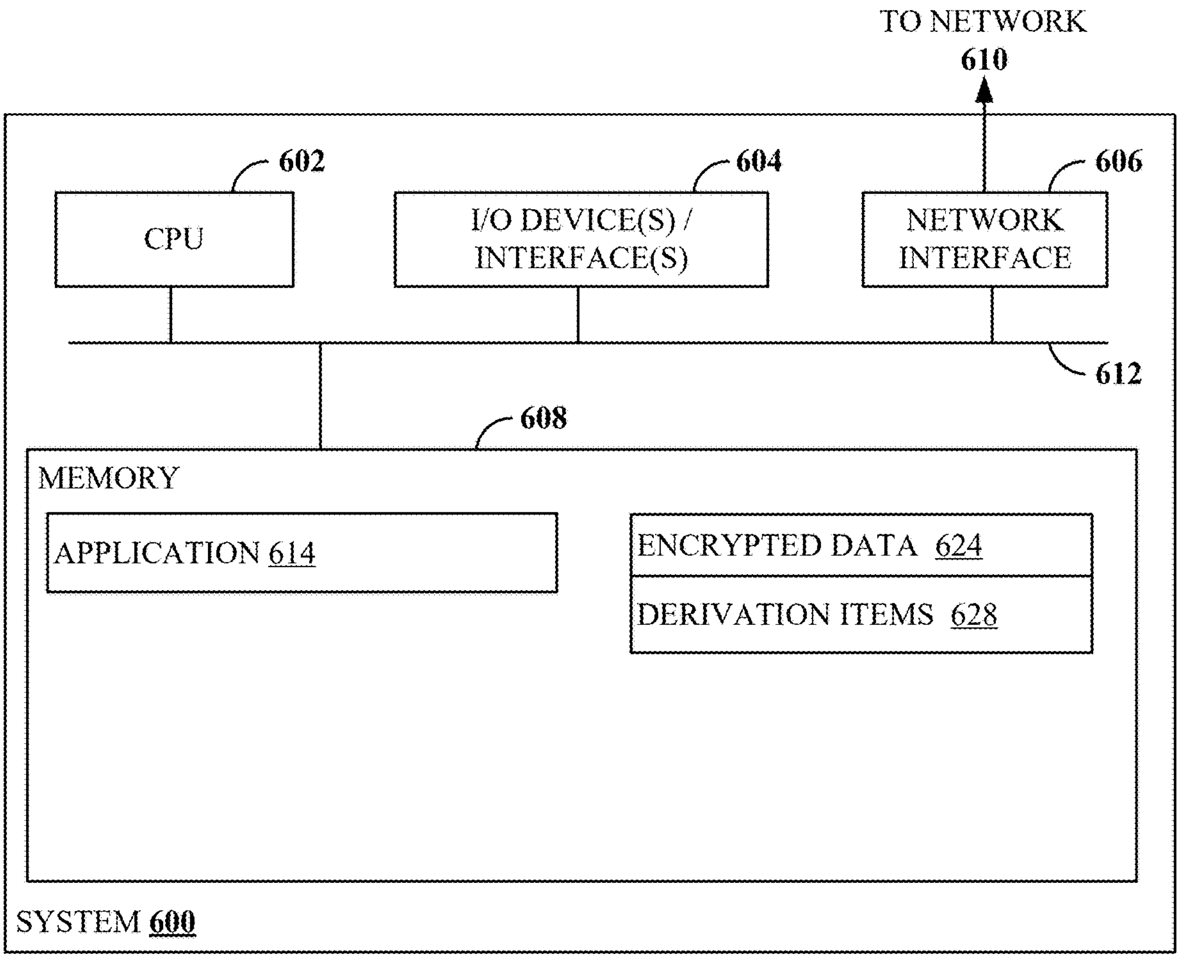
FIG. 6 depicts an example of a processing system for deriving cryptographic keys.

FIG. 6 illustrates an example system 600 with which embodiments of the present disclosure may be implemented. For example, system 600 may be configured to perform operations 400 of FIG. 4 or operations 500 of FIG. 5 and/or to implement one or more components as in FIG. 1, FIG. 2, or FIG. 3.

System 600 includes a central processing unit (CPU) 602, one or more I/O device interfaces that may allow for the connection of various I/O devices 604 (e.g., keyboards, displays, mouse devices, pen input, etc.) to the system 600, network interface 606, a memory 608, and an interconnect 612. It is contemplated that one or more components of system 600 may be located remotely and accessed via a network 610. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes application 614. Application 614 may be representative of a software application associated with the client device 105 of FIG. 1, FIG. 2, and FIG. 3.

Memory 608 further comprises encrypted data 624, which may correspond to any data that may be unencrypted by the client using a derived key. Memory 608 further comprises derivation items 628, which may correspond any of the data items used to derive the derived key.

It is noted that in some embodiments, system 600 may interact with one or more external components, such as via network 610, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:
- sending, to a first remote server via a client device:
  - a public encapsulation key; and
  - a request for a blinding value and a client key;
- encapsulating the public encapsulation key via the first remote server to generate an encapsulation ciphertext and a shared secret;
- encrypting the blinding value and the client key based on the shared secret;
- transmitting the encapsulation ciphertext, the encrypted blinding value, and the encrypted client key to the client device;
- decapsulating a private encapsulation key based on the encapsulation ciphertext to obtain the shared secret at the client device;
- decrypting the encrypted blinding value and the encrypted client key at the client device using the shared secret;
- generating, via the client device, a derivation input using the client key and by hashing derivation data;
- transmitting, via the client device, the derivation input to a second remote server;
- receiving, via the client device from the second remote server, a blinded derived key generated by the second remote server using a blinded root key and the derivation input;
- unblinding, via the client device using the blinding value, the blinded derived key to generate a derived key; and
- using the derived key to encrypt or decrypt data.

2. The method of claim 1, wherein generating the blinded derived key is based on encrypting, at the first remote server, a product of a project key and the blinding value using a given encryption key that is transmitted from a database to the first remote server using a hybrid post-quantum key exchange technique.

3. The method of claim 2, wherein generating the blinded derived key is further based on:
- transmitting the encrypted product from the first remote server to the client device; and transmitting the encrypted product from the client device to the second remote server.

4. The method of claim 2, wherein generating the blinded derived key is further based on multiplying the hashed derivation data based on the encrypted product.

5. The method of claim 1, wherein generating the derivation input is based on a client key identifier generated at the second remote server.

6. The method of claim 5, wherein the client key identifier is requested by the client device from the second remote server based on a determination that the client key identifier is not cached at the client device.

7. The method of claim 1, wherein the blinded derived key is generated based on verifying a signature received from the client device.

8. A processor-implemented method, comprising:

generating, via a client device, a public encapsulation key and a private encapsulation key;

sending, to a first remote server via the client device:

the public encapsulation key; and a request for a blinding value and a client key;

encapsulating the public encapsulation key via the first remote server to generate an encapsulation ciphertext and a shared secret;

encrypting the blinding value and the client key based on the shared secret;

transmitting the encapsulation ciphertext, the encrypted blinding value, and the encrypted client key to the client device;

decapsulating the private encapsulation key based on the encapsulation ciphertext to obtain the shared secret at the client device;

decrypting the encrypted blinding value and the encrypted client key at the client device using the shared secret;

generating, via the client device, a derivation input using the client key and by hashing derivation data;

transmitting, via the client device, the derivation input to a second remote server;

receiving, via the client device from the second remote server, a blinded derived key generated by the second remote server using a blinded root key and the derivation input, wherein the blinded derived key is generated based on encrypting, at the first remote server, a product of a project key and the blinding value using a given encryption key that is transmitted from a database to the first remote server using a hybrid post-quantum key exchange technique;

unblinding, via the client device using the blinding value, the blinded derived key to generate a derived key; and using the derived key to encrypt or decrypt data.

9. The method of claim 8, wherein generating the blinded derived key is further based on:

transmitting the encrypted product from the first remote server to the client device; and transmitting the encrypted product from the client device to the second remote server.

10. The method of claim 9, wherein generating the blinded derived key is further based on multiplying the hashed derivation data based on the encrypted product.

11. The method of claim 8, wherein generating the derivation input is based on a client key identifier generated at the second remote server.

12. The method of claim 11, wherein the client key identifier is requested by the client device from the second remote server based on a determination that the client key identifier is not cached at the client device.

13. The method of claim 8, wherein the blinded derived key is generated based on verifying a signature received from the client device.

14. A method of deriving cryptographic keys, comprising:

using a key encapsulation mechanism to establish a shared secret between a client device and a first remote server;

encrypting a blinding value and a client key using the shared secret at the first remote server;

decrypting the encrypted blinding value and the encrypted client key at the client device using the shared secret;

generating a derivation input using the client device based on the client key, wherein the derivation input is transmitted to a second remote server;

generating a blinded derived key at a second remote server based on the derivation input; and unblinding the blinded derived key at the client device using the blinding value.

15. The method of claim 14, wherein generating the blinded derived key is based on encrypting, at the first remote server, a product of a project key and the blinding value using a given encryption key that is transmitted from a database to the first remote server using a hybrid post-quantum key exchange technique.

16. The method of claim 15, wherein generating the blinded derived key is further based on:

transmitting the encrypted product from the first remote server to the client device; and transmitting the encrypted product from the client device to the second remote server.

17. The method of claim 15, wherein generating the blinded derived key is further based on multiplying hashed derivation data based on the encrypted product.

18. The method of claim 14, wherein generating the derivation input is based on a client key identifier generated at the second remote server.

19. The method of claim 18, wherein the client key identifier is requested by the client device from the second remote server based on a determination that the client key identifier is not cached at the client device.

20. The method of claim 14, wherein the blinded derived key is generated based on verifying a signature received from the client device.

* * * * *